ELECTROLYTIC METHODS AND APPARATUS FOR STORAGE OF INFORMATION

Original Filed March 11, 1959 2 Sheets-Sheet 1

INVENTOR
W. J. FINNEY

BY Cushman, Darby & Cushman
ATTORNEYS

Dec. 2, 1969 W. J. FINNEY 3,482,217

ELECTROLYTIC METHODS AND APPARATUS FOR STORAGE OF INFORMATION

Original Filed March 11, 1959 2 Sheets-Sheet 2

INVENTOR
W. J. FINNEY

BY Cushman, Darby & Cushman
ATTORNEYS

3,482,217
ELECTROLYTIC METHODS AND APPARATUS FOR STORAGE OF INFORMATION

William J. Finney, Rte. 1, Box 570, Accokeek, Md. 20607

Continuation of application Ser. No. 798,710, Mar. 11, 1959. This application Aug. 20, 1963, Ser. No. 303,441
Int. Cl. G11b 9/00
U.S. Cl. 340—173 28 Claims This invention relates to methods of storing information, and in particular relates to signal recording and reproducing techniques.

This application is a continuation of my application Ser. No. 798,710, filed Mar. 11, 1959 now abandoned.

Today, information to be stored frequently exists as an electrical signal of some sort, and it is often necessary to recover the information from storage in electrical form. Thus, in a wide variety of situations information to be stored occurs as a single time-varying electrical voltage, and after storing the information, it is desired to reproduce the same time-varying voltage in the same sequence as it occurred originally. The simple office dictating machine and the home phonograph are perhaps the best known examples of this type of information storage and recovery.

The disc phonograph, the dictating machine and most other methods for storing the kind of information referred to above have in common two major shortcomings which date back to Edison's original phonograph: first, they require an enormous quantity of recording material for each unit of information stored, and second, they represent the time element of the information by a gross relative motion between the recording material and the record and reproducing device. In the most efficient disc or magnetic tape recording devices over 10,000,000,000,000,000 individual particles of matter are used for each unit of information stored, and in all these devices the time which elapses while the information voltage variations takes place is represented by mechanically moving the recording medium past the recording device at what is supposedly a constant speed of the order of several inches per second. This mechanical movement generally requires relatively large amounts of power, both for recording and for playback.

It is an object of this invention to provide methods for storing and recovering information which require a relatively small quantity of storage material for each unit of information and which eliminate the requirement of a gross mechanical motion as a time base.

It is a further object of this invention to provide a method of storing information by means of variations in the internal structure and composition of a solid.

A still further object of this invention is to provide a method of storing information as set forth in the previous paragraph, wherein the variation in structure occurs in adjacent layers whereby no movement of the storing media is required.

Yet another object of this invention is to store information by utilizing an electrode of a cell as the storage base.

Still another, and further object of this invention is to provide a method whereby information stored, in accordance with the preceding objects, may be easily recovered.

According to the invention each unit of information is stored in the position or nature of a number of normally immobile particles in a solid material; and the information is recovered by causing these particles to become mobile relative to adjacent particles, and electrically observing their position or nature at the time they move from their normal position. The particles move as ions during the time that they are mobile, and their motion may be controlled by controlling the electrical current in an external circuit. From a practical viewpoint, the time base of this method of information storage is thus an electric current rather than a gross mechanical motion.

Stated in more general terms, there are certain physical phenomena by means of which the internal structure and composition of a solid can be caused to have specific, fixed and predetermined space-varying characteristics. Also, there are certain physical phenomena by means of which the particular fixed space-varying internal structure and composition of a solid can be made to cause a particular time-varying voltage or current.

According to this invention, information can be stored by causing the internal structure and composition of a solid to have a form determined by the information which is to be stored; and the information later recovered by causing this structure and composition to provide a time-varying electrical voltage or current which has a determinant relationship to the information stored.

It should be understood that in this application, as in common use, *solution-pressure* is the term applied to tendency of atoms of a solid material to dissolve as charged ions in an electrolyte. *Osmotic pressure* is a term herein applied to the tendency of charged ions in an electrolyte to deposit as neutral atoms on a surface such as the surface of an electrode. Normally both of these processes occur continuously, and in the absence of any flow of electrons in an external circuit, the electrode will assume a potential relative to the electrolyte such that the average charged particle flow in the two directions is equal. For a particular electrolyte concentration this potential is called the normal electrode potential or the *electrochemical potential.*

The terms *solution-pressure, osmotic pressure* and *electrochemical potential* are important to a clear understanding of this invention, since with different types of material different pressures and potentials exist.

The invention may be better understood, and other objects in addition to those specifically set forth above will become apparent, when consideration is given to the following detailed description of illustrative embodiments of the invention. Certain parts of the description, for purposes of clarity, make reference to the annexed drawings showing sample circuits which may be utilized in accordance with the teachings of the invention.

Figures 1, 1A, 2, 2A:
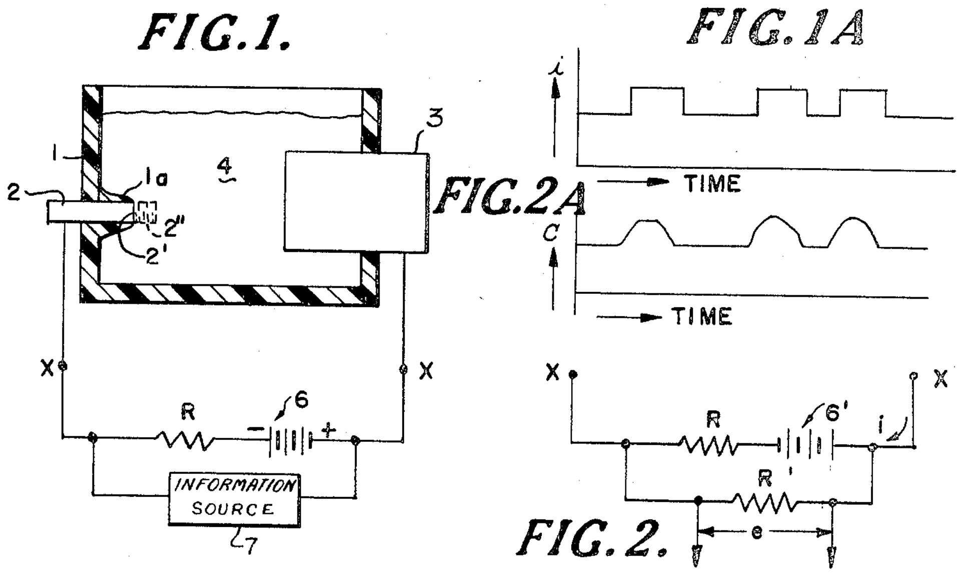
FIGURE 1 is a schematic representation of an illustrative circuit which may be used for recording information in accordance with the present invention.
FIGURE 1A is an illustrative plot of recording current versus time usable in the circuit of FIGURE 1.
FIGURE 2 is a schematic diagram of an illustrative circuit which may be used to reproduce the information recorded by the circuit of FIGURE 1 and other figures herein.
FIGURE 2A is an illustrative plot of voltage versus time, obtained by playback of information recorded as in FIGURE 1 or other figures herein.

There are at least three principal classes of materials useful in the information storage methods of this invention: (a) information storage materials which are solid state materials in which the ions and atoms are tightly bound in their positions in the body of the material, but in which the electrons have mobility; (b) particle transfer materials in which little or no electron conduction occurs, but in which certain ions have mobility; and (c) barrier materials in which neither ionic nor electronic conduction normally occurs, but which can be made conductive or destroyed or removed by special techniques.

In methods according to the invention information is recovered by means of the variation in electrode-to-electrolyte or electrode-to-electrode potential difference which occurs as successive different "layers" of the solid are uncovered by dissolution of outer layers. These potential differences are the result of the dynamic equilibrium between ions from the electrolyte becoming atoms on the surface of the electrode and atoms from the electrode becoming ions in the electrolyte, and hence depend on the so-called solution pressure osmotic-pressure dynamic equilibrium. This equilibrium is affected not only by the properties of the atoms and ions at the interface, but also by the ion concentration at the interface, and hence by the ion mobility in the electrolyte near the interface. While the electrode is dissolving, the potential difference between the electrode and the electrolyte is thus affected by the solution pressure of the atoms ("pressure" of the atoms to leave the solid as charged ions) in the surface of the electrode, the normal mobility of the ions which have just left the electrode, and the retarding effect of any insoluble compounds (oxides or hydrooxides) which these ions form in the electrolyte.

It is convenient to discuss the aforesaid first class of materials in terms of these three effects on the dynamic equilibrium potential as if they occurred separately. Actually, two or perhaps all three generally contribute to a given equilibrium potential.

If two metals having slightly different electrochemical potentials alternately form the successive layers on an electrode, which is in contact with a normal solution of both of their salts, and if the ions of both (hypothetical) metals have the same mobility and neither forms an insoluble compound in the solution, then the potential difference between the solution and the electrode will vary during anodic dissolution as first one metal and then the other comes to the surface.

If, instead, an electrode is made up of successive layers of two (hypothetical) metals having the same electrochemical potential and forming no insoluble compounds, but differing in ion mobility, then an anodic dissolution takes place and the layers of the two metals come to the surface, ions will leave the vicinity of the electrode faster when the more mobile metal layers appear. The concentration of ions near the interface will thus be greater when one metal layer appears than when the other appears, the osmotic pressure of the ions will be greater, and the dynamic equilibrium potential will vary as the layers alternate. This change in potential is called *concentration polarization.*

In the third idealized case, the two hypothetical metals forming the layers of the electrode have the same electrochemical potential and ion mobility, but one reacts with the electrolyte to form a partially soluble, partially impervious film while the other forms no solid compound. When the film-forming layer appears, ion mobility is reduced and again concentration polarization occurs. When the other layer appears, film formation stops, the partially soluble film dissolves or breaks up, concentration polarization is reduced, and the equilibrium potential changes. This particular process of concentration polarization is called *anode passivity.*

In practice, no two metals have exactly the same electrochemical potential or the same ion mobility, and most metals form some partially soluble anode compounds. All three of these effects thus occur simultaneously and contribute to the dynamic equilibrium potential. However, materials can be chosen so that one or another of the three effects predominates in a particular situation.

A fourth effect, in which variations in potential drop across the electrolyte are caused by varying ion mobility, and a fifth effect, in which the mobility of one kind of ion in the electrolyte is changed by supplying a small number of another kind of ion from the surface layer of the electrode, also will be discussed hereinbelow. Any or all of these effects can be used to store and recover information, when successive layers of the electrode result in differing potentials, and when the successive layers are removed from the entire face of the electrode simultaneously.

Information storage materials according to the invention are solids, since otherwise a rapid diffusion of particles would result in complete loss of information when the material become homogeneous. The stored information is contained in the composition or structure of successive layers in the solid, and is recovered by observing the electrical effects of these successive layers as they come to the interface during the anodic dissolution of the solid. The way in which the interface moves through the solid depends on several things, including the potential gradients in the electrolyte, the formation of chemical films, and the lattice structure of the electrode. If the constituent metals of the electrode have nearly equal electrochemical potentials and nearly equal atomic radii, both metals can be deposited or removed simultaneously and both metal atoms can fit into the same lattice positions interchangeably—i.e., they can form substitutional alloys from ionic solutions. Thus the electrode is preferably a single crystal, which minimizes the problems caused by different dissolution rates along different crystal axes. The use of a single lattice structure also makes possible the use of particular lattice dislocations to control the mode of growth and dissolution. Control of composition, and the generation of variations in potential, can be done with these alloys by using small differences in ion mobility and film reaction instead of, or in addition to, the differences in electrochemical potential.

The selection of alloys for these methods for information storage is thus generally based on electro-chemical potential, atomic radius, crystal structure, and anodic activity. In the case of a binary alloy the electrochemical potential of the two metals should be close enough together that corrosion couples don't cause a rearrangement of atoms during deposition. In order to use a single crystal electrode, the atomic radii of the two metals should differ by less than about 10% so that both kinds of atoms may fit into the same lattice structure, and the metals should tend to the same close packed structure at normal temperatures. Both metals should have sufficient anodic activity in suitable electrolyte so that dissolution can take place. The information necessary for such selection is available in standard tables and handbooks. Nickel and cobalt, for example, ideally meet the above criteria, having normal electrochemical potentials that differ by only about 0.03 volt and atomic radii that differ by only about 0.01 angstrom. Both metals can form face-centered cubic crystal structures, and either will form an oriented overgrowth on the structure of the other, even though cobalt alone will nomally crystalize into a hexagonal close packed lattice at room temperatures. Further, nickel and cobalt both have good anodic activity in chloride solution, but differ sufficiently that concentration polarization from the lower nickel activity can be used to provide a read-out voltage. Other metal combinations may be selected by means of these criteria and the available tables and handbooks.

In order to put information into store and recover it from store by the methods of this invention it is necessary that the normally fixed information-storing particles become mobile. The materials in which some individual particles of matter are mobile, but in which little or no electron conduction occurs, are called *electrolytes.* The term is used here to include some of the semi-conductor materials and other solid ionic conductors, as well as the liquid electrolytes.

The processes involved in liquid electrolytes are the most fundamental since all particles in the liquid are free to move, and all charged particles tend to move along lines perpendicular to equi-potential contours. Very high current densities can be used with liquid electrolytes, and surface migration of atoms can take place along the face of the electrode in building up or dissolving the lattice structure. It is, however, difficult to control the exact geometry of the moving liquid-solid interface and hence to control the potential gradients and the motion of the interface. Liquid electrolytes can be used with polycrystalline electrodes if concentration polarization or anode passivity predominate and if differences in electrochemical potential are very small. Very high anode current densities are used to increase the polarization effects and thus to reduce the relative effect of electrochemical potential and lattice orientation (as long as the electrochemical potential differences are small compared to normal gas polarization, so that corrosion couples do not exist.)

With single crystal alloy electrodes the matter is simpler. If the electrode is made up of two metals having similar atomic radii and electrochemical potentials, in a liquid electrolyte, the equilibrium between particles leaving the electrode and particles depositing on the electrode is similar to that for a hot metal cathode in a space-charge limited vacuum tube. However, in the electrochemical cell the particles that take part in the interchange cannot come from or depart to the interior of the solid, though they can migrate on the surface. Thus, when no electrical current flows in the external circuit there is still a continuous random interchange of particles between the liquid and the solid, but no net accumulation of particles in either place after equilibrium is reached. When an electrical current is made to flow from the electrode in an external circuit, the potential of the electrode must change to a value for which the rate of particles leaving the electrode and particles collecting on the electrode differ by an amount corresponding to the external current flow. There are also, of course, changes in ion concentration and in chemical interaction which further affect the equilibrium. Considered only from a physical viewpoint, charged metal ions continuously strike the electrode, give up electrons to become neutral atoms and migrate randomly over the surface until they come to a lattice position of low energy (such as an inside angle, corner, or hole) or until they again leave the surface as ions. Similarly, neutral metal atoms continuously leave the higher energy positions (flat unfilled lattice planes) as charged ions and diffuse through the liquid or return again to the solid. Since the surface atoms migrate, and tend to remain in positions of minimum energy, the form of growth or dissolution of single crystal electrodes can be to some extent controlled by certain kinds of lattice defects which provide self-perpetuating low energy positions for atoms to fill, or high energy positions for atoms to leave. The single screw dislocations which give rise to metal "whiskers" a few microns in diameter with a single growth face are significant examples of this. With liquid electrolytes either the electrode-electrolyte potential difference or the potential drop through the electrolyte can be made to vary with varying composition of the outer layer of the electrode. In the former case, the composition and quantity of the electrolyte in the cell is not necessarily critical; in the latter case, the electrolyte consists of a thin micro layer between the two electrodes so that its composition, and hence its impedance varies as the outer layer of the anode varies.

The same distinction exists in the electrode-forming or information-storing process. An electrolyte whose average composition does not change may be used, and recording done by changing only the layer a few molecules thick around the cathode, or a micro-cell may be used in which the composition of the entire electrolyte is modulated. In either case information-controlled variations in some other physical process which affects the deposited material, may be used to record information. For example, variations in light striking the cell (photochemical effects), variations in acoustic waves or in mechanical vibrations (and hence variations in solution motion or in acceleration forces near the electrode), and other such effects are known to cause variations in the properties or composition of material being deposited. Similarly, variations in the electrical voltage or in optical or other physical properties of the cell during removal of the information-storing layers may be used for recovering information during playback.

In information cells using solid electrolytes, not all of the particles in the electrolyte are free to move, and those which do move are under specific restrictions resulting from the rigid lattice structure through which they must pass. Movement takes place either by particles moving through the spaces between the normal lattice positions (interstitial migration) or by the particles moving into vacant positions which are caused to exist in the lattice structure (vacancy migration). In addition to the variation in mobility, and hence in potential drop across the electrolyte, caused by using two metal ions having different normal mobility, a variation in potential drop can be caused in this instance by introducing from the electrode a material which affects the number of vacancies existing in the lattice structure of the electrolyte and hence affects the mobility of the other ions. For example, introducing a relatively small number of ions having a double negative charge into a lattice made up of single charge ions (such as Cd into AgCl or AgI) causes a number of lattice vacancies equal to the number of foreign ions introduced, since the net charge in the solid must remain unchanged. The mobility of the normal ions is greatly increased by these vacant positions and the potential drop is decreased. After the divalet ions pass through the solid by vacancy migration the potential drop increases until another layer or divalent ions comes off the anode. The location and quantity of the divalent atoms in the electrode is, of course, determined by the information to be stored.

In special situations it will be sometimes desirable to exercise a form of control over the information flow, and certain forms of control may also be used to reduce physical limitations on the recording methods. Materials which are used to provide these external controls on the information flow are herein called *barrier materials,* and these are the third class of materials referred to above.

Barrier materials form layers (barrier layers) which do not normally have either ionic or electronic conduction, and are not readily soluble in the materials which they contact. They are on or near the face of a storage electrode under specific conditions, and are removed or destroyed by special techniques such as electromagnetic or acoutical irradiation, or voltage or current pulses. The barrier layers may be formed by chemical reactions at the electrode surface as certain materials are uncovered by anodic dissolution; or they may be formed as layers on the electrode during the deposition (recording) process. In the latter case the barrier layers must provide some electrical conduction.

Barrier layers are used in the processes of the present invention to prevent further dissolution of the anode (and consequently to reduce or stop current flow) until they are removed. Barrier layer formation results in anode passivity and, as is well known, some forms of passive layers can be removed by ultrasonic irradiation of the layer, others by optical irradiation, and others by the application of a high voltage pulse, say ten times the stripping or dissolution voltage. Since the formation of these layers results in either a decrease in current or an increase in voltage across the cell, this change in voltage or current can be used to trigger a mechanism for removal of the layer; or the layer can be left intact until an external decision is made to initiate its removal. Thus the passive layers can be used to stop dissolution momentarily until all material outside a layer has dissolved and the passive layer then removed automatically, as a means of restoring interface alignment; or the passive layer can be used as a means to stop information flow until further information is called for by an external device. The latter application provides for digital and pulse-position-modulation recording, as well as for very flexible control of playback.

The barrier materials themselves can be atoms of a metal which forms insoluble anotic films, such as nickel in sulphate electrolytes; they can be materials which react with the electrolyte and storage material together to form insoluble anodic films; or they can be layers of material which is actually embedded in the electrode during recording, and remain intact until uncovered and removed.

A simple pulse-position-modulation recorder provides an example of the use of these barrier layers. One metal A which has no tendency to anode passivity is used, together with a metal B which forms an anode film which is highly insoluble except in the presence of an ultarsonic irradiation. Recording is done by depositing metal A at constant current during the absence of a signal pulse and depositing metal B during the presence of a short signal pulse. Thus the quantity of metal A between thin layers of metal B is proportional to the spacing between successive signal pulses. During playback a current flows through the cell until all of the atoms of metal A in the outer layer are removed. The entire surface now consists of metal B, and complete anode passivity results. The current through the cell drops and the voltage rises, giving an output pulse. This pulse is used to initiate a momentary ultrasonic irradiation of the anode surface which destroys the anode film and lasts just long enough for all of metal B in the layer to be removed by the resulting current flow. Current continues to flow until all of another layer of metal A is removed, again leaving a layer of metal B and resulting in anode passivity and in an output pulse. The time which elapses between these pulses is proportional to the time which elapsed between the corresponding pulses in the original recording process. Since the original pulse spacings were modulated in accordance with an information source, the information is reproduced in the pulse spacing of the voltage pulses occurring each time a layer of metal B comes to the surface; and the information is stored in the quantity of metal A which lies between successive layers of metal B. Many variations of this method are possible, such as replacing metal A by a varying ratio binary alloy, so that the voltage across the cell during removal of the layers between the layers of metal B is proportional to the ratio of the metals in the alloy. Modulation of both the pulse spacing and the voltage between pulses is thus possible.

In FIGURE 1 there is illustrated one form of circuitry and apparatus for performing aspects of the present invention. Reference character 1 designates a cell made of glass or other suitable nonconducting material, such as a so-called "plastic" in solid state. Reference character 2 designates an electrode fixed in a side of the cell. As one example, this electrode may be made of platinum metal. It is preferred that the face 2' of the electrode 2 be the only part of the electrode exposed to the interior of the cell, and for that reason the material of which the cell is made is shown extending as at 1*a* to cover the surfaces of the electrode 2 except for the face 2'. Through another side of the cell there is inserted and fixed an electrode 3. In the embodiment under discussion it is preferable that the area of the electrode 3 disposed within the cell be substantially greater than the exposed area 2' of electrode 2. Finally, within the cell there is provided a body of liquid electrolyte 4. To give exemplary data for a workable system as thus far described, the electrode 2 as shown in FIGURE 1 of platinum may have a circular face 2' of 0.001 square centimeter, the electrode 3 may be circular in cross section and a 50-50 alloy of cobalt and nickel, and the electrolyte may be the chloride salts of cobalt and nickel. With the electrode 2 cylindrical and providing the aforesaid 0.001 square centimeter surface area at 2', the remaining structure as shown in FIGURE 1 can be scaled according to the drawing.

As additionally shown in FIGURE 1, electrical circuitry may be provided including a battery 6 or other electrical current source with its positive terminal connected to the electrode 3. The negative side of the current source may be connected through resistance R (which may be the internal resistance of the source 6) and this resistance otherwise connected to the electrode 2. Suitably arranged with the current source is any suitabl device 7 responsive to information to be recorded, for from time to time affecting the magnitude of flow of current *i* through the cell. FIGURE 1A is intended to demonstrate a typical plot of current *i* versus time.

Referring to FIGURES 1 and 1A, with the information source 7 in a given state, and therefore current *i* of a certain magnitude, a deposition of a certain percentage alloy of nickel and cobalt will progressively build up on the face 2' of the electrode 2. However, a change in the magnitude of the current *i*, for example, an increase in the current, will result in a now different percentage alloy of nickel and cobalt building up on the previous alloy deposit on the electrode 2. To further develop the example, the electrolyte 4 may be a chloride solution consisting of 90% nickel and 10% cobalt, with a pH of 1.5. With this solution, densities of current *i* varying from 10 to 40 milliamperes per square centimeter through the face 2' of electrode 2 results in deposits varying from about 50% nickel and 50% cobalt for the aforesaid 10 milliamperes, to deposits of about 90% nickel and 10% cobalt for the aforesaid 40 milliamperes. Therefore, it should now be understood that if the current *i* has been varied by the information source through a succession of changes as diagrammed in FIGURE 1A, successive layers of nickel-cobalt alloy are deposited upon face 2' of electrode 2, and the alloy composition changes from time to time in percentage alloy composition. The dash line diagramming designated 2'' in FIGURE 1 is intended to visually suggest the aforesaid successive deposits built up upon the electrode 2. It should also be clear at this point that the built-up deposits are now a store of the information which has been presented to the circuitry during the recording process.

Turning now to recovery of the information, it is notable that because of differences in nickel and cobalt ion mobilities and in the solubilities of some of their oxides or hydroxides which form when they are made anodic, the difference in potential for nickel and cobalt as anodes is actually greater than the difference in their normal electrode potentials, but has the same sign. Thus, as successive layers having differing alloy compositions are removed from the electrode with a constant current, the variations in electrode-to-solution voltage may be greater than the difference between the normal electrode potential of nickel and cobalt; but they serve to indicate the variations in nickel-cobalt ratio of the successive layers as they come to the surface, and hence indicate the information-controlled variation in the deposition current which was used to build up the alloy electrode originally.

Mixing of deposited layers as occurs with some plating techniques is undesirable. The utility of this invention depends specifically on the lack of mixing of the layers and on their clearly behaving as if they were not mixed. Of course, in this aspect of the present invention the current or other parameter controlling the metal ratio is varied in a manner determined by the information content of a message—not in some predetermined way designed to impart particular mechanical, corrosive, decorative, or other properties to the alloy for uses other than information storage.

Read-out of "playback" of the stored information can be acomplished by replacing the circuitry shown in FIGURE 1 below the terminals $x$, $x$ with the circuitry shown in FIGURE 2. The battery or current source, now designated 6', is reversed in polarity and a resistance R' is added, in parallel to the battery and resistance R, for read-out of information. A condenser C may be added in series with the resistance R', the value of the condenser being so chosen that the information-containing variations in voltage appear across R', but the DC component of voltage is removed. With the same electrolyte 4 in the cell, connection of the FIGURE 2 circuit results in a progressive ionic movement from the deposit on the electrode 2 into the solution. Otherwise stated, the built-up cobalt-nickel alloy deposits on the electrode 2 are successively "stripped off." It will be apparent from what has been said heretofore that at any time during strip off as the interface between the remaining deposit on electrode 2 and the electrolyte changes from being an interface with a given percentage nickel-cobalt alloy to an alloy of different percentage composition, the voltage $e$ across the resistance R' will change in value and this voltage will increase in magnitude when the alloy composition coming off the electrode 2 becomes an alloy which was created by a relatively greater current: compare FIGURES 1A and 2A for the example as above described. Read-out voltage $e$ variations or more than 20 millivolts have been achieved when read out in the same nickel-cobalt electrolyte solution with a Ph of 7.0 and a current density of 500 milliamperes per square centimeter.

Current densities above two amperes per square centimeter can be used. Since one ampere carries $3\times10^{18}$ ions per second, there are about $10^{16}$ atoms removed from the 0.001 square centimeter electrode face each second. The spacing of atoms in the electrode is about $3\times10^{-8}$ centimeters, which we will write 3 A.°, where A.° represents an Angstrom unit which is $1/100{,}000{,}000$ centimeter. Thus an electrode face of 0.001 square centimeter contains $10^{-3}\times(3\times10^{7})^2=10^{12}$ atoms per layer 3 A.° thick. A current of 0.002 ampere removes about $10^{16}$ atoms per second, which is $10^{16}/10^{12}$ or $10^4$ atom layers each second. Each layer is about 3 A.° thick, so the interface moves $3\times10^4$ A.° (or 0.0003 centimeter) each second.

Assuming 100 atomic layers are required to store each unit of information this gives 30,000/300 or 100 units of information each second, and each unit of information is stored by $3\times10^{14}$ atoms, which is a reduction by a factor of thirty or more over that required by disc or tape recording. Since the total voltage across the cell is the order of 1 volt, and the current is 0.002 ampere, the power requirement is only about 0.002 watt.

To appreciate the significance of the invention, it is only necessary to consider the maximum material reduction which may be achieved over commercial storage systems.

To estimate the reduction in information storage material which may be obtained by utilizing this method of recording to its limit, it can be assumed that the 2 ampere per square centimeter current density taken above is used, but the size of the storage electrode is reduced to the point that the output voltage is only 1 millivolt across a 10 megohm impedance (which is still over 100 times the theoretical noise level). If a variation of 10% in the current through the impedance is assumed, then the current must be about $10^{-2}/10^{-7}=10^{-9}$ amperes, and the interface area is thus $10^{-9}$ square centimeters, which is about the size of the smaller metal "whiskers" known in the metallurgical art. The interface has $10^6$ atoms in each 3 A.° layer, and again assuming 100 layers for each unit of information stored, we have $10^8$ atoms used for storing a unit of information. This is a reduction by a factor of more than 100,000,000 over the material required by disc or tape recording, and results in a power requirement of only about $10^{-9}$ watts for either recording or playback.

In a substitutional alloy of such metals as nickel and cobalt, the atom diffusion at ordinary temperatures is very small and would not completely intermix even adjacent atomic layers for a matter of years. It is possible that a unit of information can be stored in layers less than 100 atom diameters in thickness. It is also possible to use much higher current densities than 2 amperes per square centimeter, particularly in the micro electrolyte cells where very high voltage gradients and hence high ion velocities can be used without reaching the decomposition potential of any of the materials.

For the system of FIGURES 1 and 2, the selection of platinum for electrode 2 is mentioned to preclude the possibilities on playback that removal of the electrode 2 material might occur if a path thereto should develop through or behind the nickel-cobalt alloy deposits built up thereupon. If electrode 2 is platinum, this material will not strip off in a cell as described. If a sneak path behind the information storage alloy deposits can be avoided, then the electrode 2 may be of any suitable electrically conductive material, in fact, can be a suitably oriented single crystal of nickel-cobalt alloy.

Figure 3:
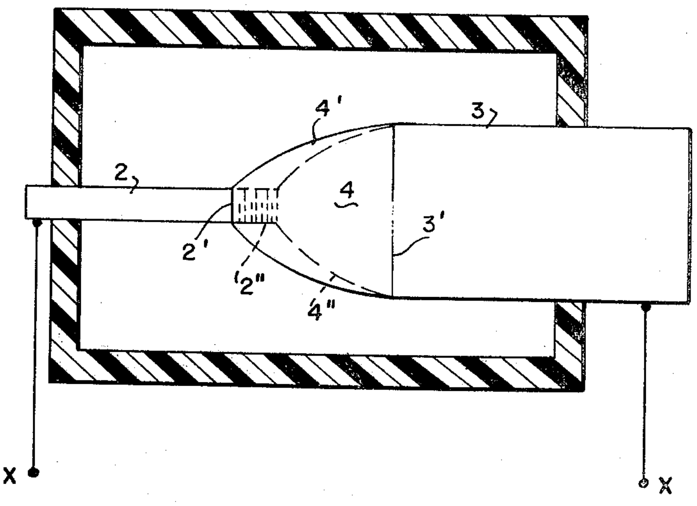
FIGURE 3 is a schematic representation of a different embodiment of apparatus for recording and playing back information in accordance with the present invention.

To simplify the construction of cells having very small electrode spacings and hence high current density and high ion velocity with low electrode potentials, and to reduce any sneak path problems as just explained, structure as shown in FIGURE 3 may be provided. In this case the cell designated 1' is entirely closed and hermetically sealed to the electrode 2 and 3. The structure is to be made small enough so that the electrolyte 4 will maintain itself upon the faces 2' and 3' of the electrodes 2 and 3 by reason of surface tension of the electrolyte. Therefore, in this case the electrolyte will be bounded by its own self-supported surface designated 4'. As deposits 2'' build up, the surface 4' will change position as shown by chain line 4'' and thusly only the electrode-electrolyte interface commensurate with the end of the build-up is wetted. It will be appreciated that within a hermetically sealed cell 1' a vapor pressure of the electrolyte will build up within the cell until further evaporation of the liquid electrolyte terminates. Since the surface tension tends to maintain the greatest volume to surface ratio, the electrolyte will not wet other than the faces 2' and 3' of the electrodes, and as alloy deposits are built up, only the face of the alloy will be wet. Thusly, the likelihood of sneak paths to the electrode 2 per se is reduced, and electrode 2 can be of any suitable material. The electrode can be a single crystal of nickel-cobalt alloy, and since the two constitutent metals of the alloy have atoms of about the same diameter they easily form the same lattice structure (i.e., either will easily form an oriented overgrowth on the other).

It should be mentioned that the embodiment of FIGURE 3 is the equivalent of the embodiment of FIGURE 1, with regard to the fact that the volume of the electrolyte is great with respect to the area of the interface between the electrolyte and the storage electrode 2. It will be further understood that the circuitry of FIGURES 1 and 2 can be used in the FIGURE 3 structure between the terminals $x$, $x$.

Figure 4:
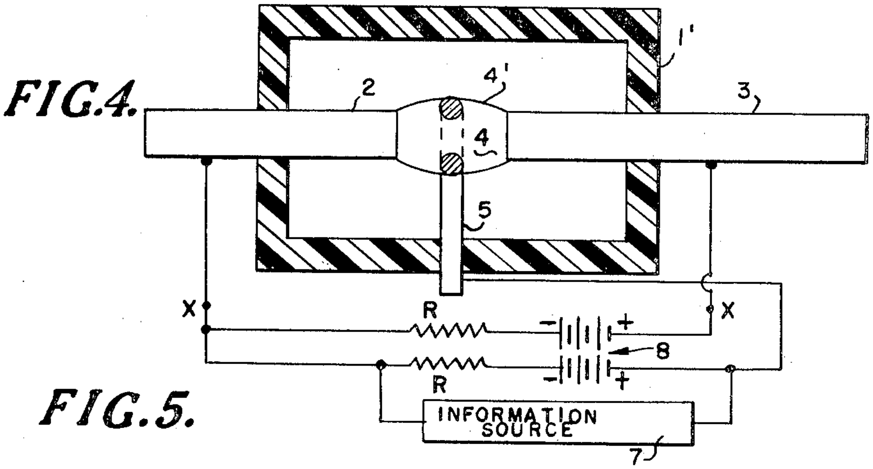
FIGURE 4 is a schematic representation of still another embodiment of circuit and apparatus for recording and playing back information in accordance with the present invention.

FIGURE 4 shows structure similar to that of FIGURE 3, in that the cell 1' is hermetically sealed to the electrodes 2 and 3 and the electrolyte 4 is self-maintained between the electrodes 2 and 3 by its own surface tension. However, in FIGURE 4 the area of the interface of both electrodes 2 and 3 with the electrolyte 4 has been made equal for purposes of illustration, and by way of further explanation it is to be understood that the volume of electrolyte 4 in this case is to be greatly reduced with respect to the volume shown in FIGURE 3, for purposes which will hereinafter be more fully explained. In FIGURE 4 a further electrode 5 has been added, with a portion of this electrode in the form of a ring positioned intermediate the ends of electrodes 2 and 3.

In one exemplary case the electrode 5 may be made of one of the constituents of the intended alloy to be deposited upon the storage electrode 2. For example, where the anode-electrode 3 is a nickel-cobalt alloy, the electrode 5 may be either nickel or cobalt. As shown in FIGURE 4, the electrode 5 may be connected to a separate positive terminal of a current source 8, and the information imparting device 7 may be connected with the circuit of electrode 5, or the circuit of electrode 3. In either case, there can be current fluctuations in the control circuit, and a steady forward current in the other electrode circuit, it being apparent that variations in current will cause greater or lesser amounts of given metal or alloy to be imparted to the electrolyte 4 by ion movement and will thusly control the alloy composition of the build-up in the storage electrode 2. It is for this reason that the volume of electrolyte 4 in FIGURE 4 has been kept to a minimum, so that there may be a significant and rapid change in the relative ion concentrations in the electrolyte as the currents through the respective electrodes 5 and 3 are changed. If there is a relatively great body of electrolyte (FIGURES 1 and 3) a given injection of extra ions from a separate electrode would not be as significant and would require considerable time to change the compositon of the electrolyte. In FIGURE 4 it will be appreciated that instead of the electrode 3 (or the electrode 5) being an alloy, each can be a pure but different metal, for example, one cobalt and the other nickel, and changing of relative currents therethrough will cause the depositing of differing alloy upon the storage electrode 2 at the interface between the electrolyte and the electrode 2.

For purposes of read-out, the circuit of FIGURE 4 may be used with the circuit of FIGURE 2 and the electrode 5, while present, would not have to be involved in the read-out process.

Figure 5:
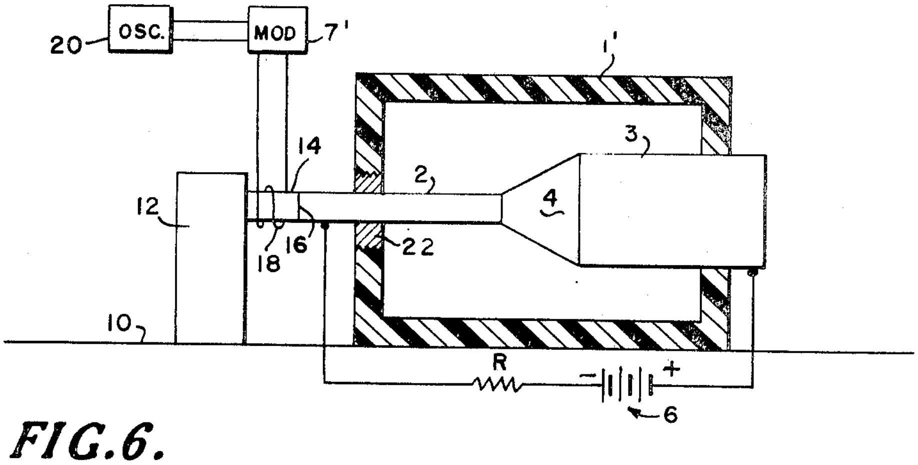
FIGURE 5 is a schematic representation of still another embodiment of circuit and apparatus for recording information in accordance with the present invention.

FIGURE 5 shows an arrangement similar to that of FIGURE 3, to the extent that a sealed cell 1' is employed with electrolyte 4 supported by its surface tension between electrodes 2 and 3. However, cell 1' is secured at its bottom to a body 10 and also secured to this body is a structure 12 having a magnetostrictive member 14 extending therefrom to which the electrode 2 is connected as at 16. About the member 14 is wound a coil 18 to be energized by an oscillator 20 capable of delivering, for example, 25 kc. current. The circuit between oscillator 20 and coil 18 is further characterized by insertion of a suitable amplitude modulating circuit 7', to be energized by information to be stored or recorded.

The system of FIGURE 5 is further characterized by provision between electrodes 3 and 2 of a current source 6 and resistance R, with the positive terminal of 6 connected to electrode 3. In operation, the intensity of vibrations of electrode 2 caused by the oscillator 20 causes a certain mobility or vibration of the ions in the electrolyte 4, particularly near the interface between the electrolyte 4 and the electrode 2, and the degree of this excitation will itself change the alloy composition of the successive layers of deposit built-up upon the electrode 2 as storage of information progresses. Thusly, information applied to the modulating circuit 7' will cause fluctuations in the amplitude of the current through coil 18 and therefore corresponding periodical changes in the amplitude and vibration of the interface between electrode 2 and the electrolyte 4. Where the electrolyte is a nickel-cobalt solution, during periods of more intense or high amplitude vibration of the electrode 2, the alloy will become more concentrated in cobalt and less concentrated in nickel.

In FIGURE 5 reference character 22 designates material having some resiliency to permit the reciprocating movement of electrode 2 with respect to the cell 1'. However, for the usually small amplitude movement involved, flexing of the wall of the cell 1' could suffice with the electrode 2 firmly anchored therein. Additionally, since it is the agitation of the electrolyte which is the important point, a vibratory means could be applied to the entire cell with operable results, or a separate probe immersed in the electrolyte and no restriction to the arrangement of FIGURE 5 is necessary or intended as a means of imparting information-controlled vibrations to the electrolyte.

Returning to FIGURE 4, the electrode 5 may, in fact, be made of a material which will inject foreign matter into the electrolyte at certain times and not at others, dictated by the flow of information. In other words, the injection of foreign matter can be in accordance with the information. As an example, where the electrode 3 is a cobalt electrode, and the electrolyte is basically a solution of cobalt chloride, the electrode 5 could be made of nickel. With deposits built up accordingly upon the electrode 2, during playback, when stripping off a layer having a higher concentration of foreign material, the output voltage of the system will vary accordingly and thus the information retrieved.

Figure 6:
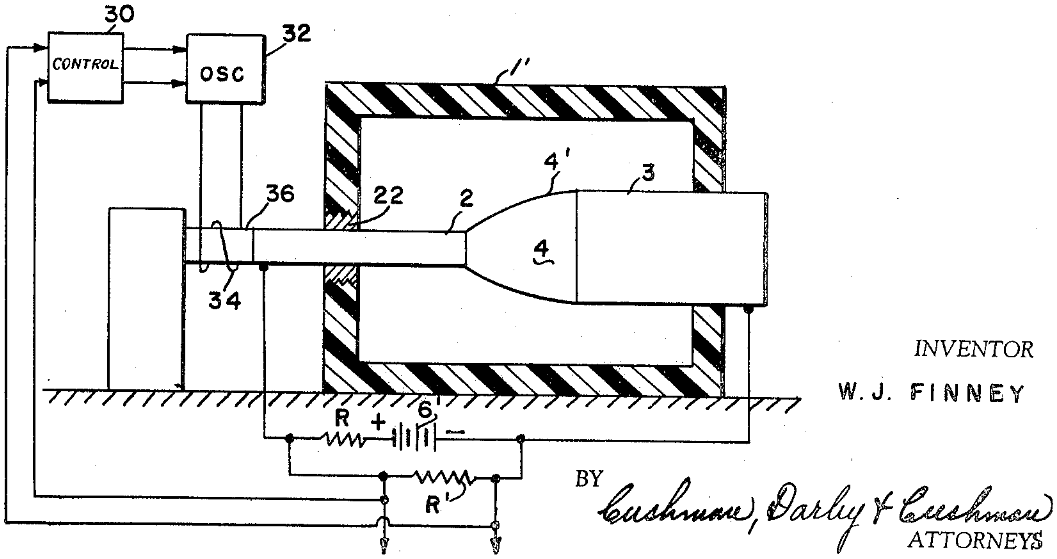
FIGURE 6 is a schematic representation of still another embodiment of circuit and apparatus for playing back information in accordance with the principles of the present invention.

FIGURE 6 shows read-out or playback apparatus using the aforesaid barrier control principle. Assume that in FIGURE 6 recording has previously been accomplished as shown by the dash line build-up on electrode 2. Assume that the build-up is a cobalt-nickel alloy, of varying composition in the respective layers. Now assume that the electrolyte is changed to a sulphate solution, now designated 4', and battery 6' is connected across electrodes 2 and 3 with the positive terminal on electrode 2. When the stripping-off action causes the interface between electrolyte 4' and electrode 2 to reach an alloy high in nickel, the read-out voltage *e* across R' will rise sharply, and the stripping-off action will substantially stop. However, this rise in voltage *e* may be applied to any convenient control circuit 30 to trigger an oscillator 32 to pass a high intensity current of high frequency, say 100 kc., through coil 34, and the current thusly acts upon a magnetostrictive member 36 (compare with FIGURE 5) to vibrate the electrolyte 4' via the electrode 2. Again, vibrations could be imparted to the entire cell, or to the electrolyte by a separate probe inserted therein. In any event, the vibrations of the electrolyte 4' permit the voltage applied from source 6' to now proceed with the removal of the layer which otherwise caused a self-termination of the stripping-off process. The device 30 can be a bi-stable multivibrator type circuit with and "on" period determined by the expected duration of stripping-off of the barrier layer. If sufficient time has been given the oscillator 32 to strip off the barrier layer, the oscillator will be turned off automatically and the read-out continue until a new barrier layer is reached whereupon the aforesaid sequence of events re-occurs. Of course, the connection between the control circuit 30 and the output voltage resistor R' can be eliminated and the control circuit 30 instead dependent upon manual energization, or energization from associated equipment. In this way, read-out can be discontinued until a human operator or associated equipment is ready to continue the read-out operation.

Irradiation with electromagnetic waves can also be used to cause stripping action to continue through a barrier layer. In this case the source of electromagnetic waves would be turned on and off as is stated for the case of oscillator 32 in FIGURE 6.

Further in regard to playback where barrier layers are involved, these can be removed by a forward or reverse voltage or current pulse of considerable magnitude. For example, if in a cell such as shown in FIGURE 6 a barrier is reached so that stripping-off action stops, instead of the use of vibrations as mentioned in regard to FIGURE 6, or other irradiations as elsewhere mentioned herein, the application of a voltage roughly ten times that of source 6' would permit stripping-off to progress until the barrier material is removed. The application of such a voltage or current pulse could be under the control of the read-out voltage, or could be manually or otherwise externally applied.

It will be appreciated that the recording apparatus in FIGURES 1, 3, and 5 presents cases where the composition of the bulk of the electrolyte remains relatively unchanged during recording, due to its relatively great volume. And the composition of the layer of electrolyte immediately in contact with the cathode 2 is varied by varying the cathode current density or by motion of the cathode or electrolyte. An example of this is the situation where the mobility of two constituent ions of the electrolyte differ, so that an increased ion flow results in a reduced concentration of the lesser mobile ions near the cathode surface. On the other hand, FIGURE 4 illustrates the apparatus in which the composition of the entire electrolyte is modulated by the information signal, due to its relatively small volume. In the absence of the signal the cathode current is supplied partly through the main electrode 3 and partly through the auxiliary electrode 5. Where these are composed of different metals the information signal changes the ratio of the two ions present in the electrolyte—and therefore the ratio of the two metals deposited upon the cathode. In this case a very small quantity of electrolyte is used, and a very high current density is to be employed so that the ion transfer time in the electrolyte is small. For example, when the electrode spacing is $10^{-3}$ centimeters and the potential drop through the electrolyte is 0.1 volt, a gradient of 100 volts per centimeter exists and the ion velocity may be as high as 0.1 centimeter per second. This results in an ion transit time of 0.01 second.

Where in FIGURE 4 the auxiliary electrode 5 is of a material such as cadmium in an otherwise silver electrode-electrolyte system, it is a means for injecting foreign ions into the electrolyte, and therefore into the cathode tube. The cathode having foreign ions thusly injected therein is such that when used later for playback the mobility of the present ions will be varied as the foreign ions (say cadmium) come off the storage electrode.

The storage electrode 2 is preferably a single crystal oriented so as to give a reasonable flat crystal growth—or dissolution—on the interface with the electrolyte, and composed of atoms that can fit into a single lattice structure (although for special apparatus other lattice structures may be employed).

From the foregoing it will be understood that for the purposes of my invention the term "recording" means those methods which are used to vary the internal structure of the composition of a solid electrode in accordance with information to be stored. "Playback" means those methods which are used to retrieve in usable form, the information which was thus stored.

It is also to be noted that two general situations are presented herein and distinguished:

One is a situation in which the short term (information rate) variations in the composition of the bulk of the electrolyte are not central to the process. These have been shown hereinabove with a large recording anode-electrode 3 and a large volume of electrolyte 4. See FIGURE 1, for example. The second situation is where variations in the composition of the bulk of the electrolyte during a single information cycle (for example, a cycle in FIGURE 1A) are a primary part of the process. These are shown hereinabove with a small recording anode-electrode 3 and a small volume 4 of electrolyte. See FIGURE 4, for example. In the first case the electrolyte serves as a reservoir of metal ions while in the latter case the electrolyte serves only as a means for transport of the metal ions from one electrode to the other.

It is to be understood that the foregoing illustrative examples have only been given for purposes of aiding in presenting an understanding of the various aspects of my invention, which are of scope according to the appended claims which follows.

What is claimed is:

1. A method of storing a time-varying signal waveform having a bandwidth-time duration product of greater than one-half comprising the steps of:
- forming by electrolytic deposition a solid body having successive superimposed layers of material with different layers having differing elemental internal composition;
- varying with time a medium controlling the character of the elemental internal composition of the deposition in accordance with the time-varying signal waveforms to be recorded, thereby causing said internal composition to differ from one layer to another as said deposition phenomenon progresses.

2. A method of recovering time-varying signal waveforms having a bandwidth-time duration product of greater than one-half which have been recorded by the method of claim 1 comprising progressively electrolytically dissolving the successive layers of the body to recover a substantial replica of said time-varying signal waveforms.

3. A method of reproducing a time-varying signal waveform having a bandwidth-time duration product of greater than one-half comprising the steps of:
- forming by electrolytic deposition a solid body having successive superimposed layers of material with different layers having differing elemental internal compositions;
- varying with time a medium controlling the character of the elemental internal composition of the deposition in accordance with the signal to be recorded, thereby causing said internal composition to differ from one layer to another as said deposition phenomenon progresses; and
- progressively electrolytically dissolving the successive layers of the body to recover a substantial replica of said signal waveform.

4. A method of recovering time-varying signal waveforms having a bandwidth-time duration product of greater than one-half from a body having successive superimposed layers of solid material with different layers having differing elemental internal composition representing the recorded signals comprising progressively electrolytically dissolving the successive layers of the body to recover a substantial replica of said signal waveforms.

5. A system for storing a time-varying signal waveform having a bandwidth-time duration product of greater than one-half comprising:
- means for forming by electrolytic deposition a solid body having successive superimposed layers of material with different layers having differing elemental internal composition;
- a medium controlling the character of the elemental internal composition of the deposition; and
- means for varying with time said medium in accordance with the signal to be recorded, thereby causing said internal composition to differ from one layer to another as said deposition phenomenon progresses.

6. A system for recovering time-varying signal waveforms from said body as defined in claim 5 and as recorded by the system of claim 5 wherein said signal has a bandwidth-time duration product of greater than one-half, comprising means for progressively electrolytically dissolving the successive layers of the body to recover a substantial replica of said signal waveforms.

7. A system for reproducing a time-varying signal waveform having a bandwidth-time duration product of greater than one-half, comprising:
- means for forming by electrolytic deposition a solid body having successive superimposed layers of material with different layers having differing elemental internal composition;
- a medium controlling the character of the elemental internal composition of the deposition;

means for varying with time said medium in accordance with the signal to be recorded, thereby causing said internal composition to differ from one layer to another as said deposition phenomenon progresses; and means for progressively electrolytically dissolving the successive layers of the body to recover a substantial replica of said signal waveform.

8. A system for recovering a time-varying signal waveform having a bandwidth-time duration product of greater than one-half, comprising:

a body having successive superimposed layers of solid material with different layers having differing elemental internal composition representing the recorded signal waveform; and means for progressively electrolytically dissolving the successive layers of the body to recover said a substantial replica of said time-varying signal waveform.

9. A system for storing a time-varying signal waveform as in claim 5 wherein the said form means include:

a unit having a first electrode in contact with said medium at an interface of said electrode;

means interconnecting the first electrode and the medium for providing a circuit through which electroplating current may flow with resulting deposition of elements from the electrolyte as a solid upon said first electrode;

a source of time-varying signals having a bandwidth-time duration product of greater than one-half; and means for coupling together said source and said unit to impart modulation to said deposition in the form of alterations in the elemental internal composition of the deposited solid to form layers of distinguishable internal structure upon said first electrode in accordance with said time-varying signal waveform.

10. A system as in claim 9 wherein said medium is a liquid electrolyte.

11. A system as in claim 9 wherein said medium is a solid electrolyte.

12. A system as in claim 9 wherein the modulation means include means to vary the magnitude of the electroplating current by variation of at least one parameter of said circuit interconnecting the first electrode in the medium.

13. A system as in claim 9 wherein the modulation means operates to vary the magnitude of electromagnetic energy impinged upon at least a portion of the medium.

14. A system as in claim 9 wherein the modulation means operates to vary the amounts of the constituents in the medium.

15. A system as in claim 9 wherein the modulation means operates to impart vibratory motion to at least a portion of the medium.

16. A system as in claim 9 including means separate from said first electrode to inject particles into the medium, and wherein the volume of the medium is sufficiently small in relation to the exposed surface area of the first electrode to enable particles injected into the medium to significantly alter the elemental internal composition of a solid deposition upon the electrode in a time period shorter than expected changes in instantaneous value of the signal being recorded.

17. A system as in claim 9 further including an electrode in the form of generally ring-shaped configuration in contact with said medium and in circuit with said medium and in circuit with said interconnecting means.

18. A system as in claim 9 wherein the medium in contact with said first electrode is a thin layer on the order of $10^{-3}$ centimeters or less in thickness.

19. A system as in claim 9 including a second electrode having an exposed surface spaced apart from said first electrode and wherein said medium is self-supported on said spaced apart electrode surfaces.

20. A system as in claim 19 wherein the spacing between said first and second electrodes is on the order of $10^{-3}$ centimeters or less.

21. A system as in claim 19 wherein the exposed surface area of said second electrode is at least ten times the surface area of the exposed area of said first electrode.

22. A system as in claim 19 wherein the exposed surface area of said first electrode in contact with the medium is substantially equal to the exposed surface area of said second electrode in contact with the medium.

23. A system for recovering information from a body as constructed in a storing system as recited in claim 9, said recovering system comprising means for progressively electrolytically dissolving the successive layers of the body and detecting changes in electrical signal resulting from the dissolution.

24. A system as in claim 23 wherein said electrolyte is a thin layer on the order of $10^{-3}$ centimeters or less in thickness.

25. A method of reproducing a time-varying signal waveform having a bandwidth-time duration product of greater than one-half, comprising the steps of:

varying with time, in relationship to said time-varying signal, forces in an electrolyte;

forming a space-varying solid body in relationship to said forces wherein said body is characterized by successive superimposed layers of material with different layers having differing elemental internal composition;

progressively dissolving successive layers of said body to cause the varying of forces within said electrolyte; and recovering said time-varying signal waveform by the dissolution of said body.

26. A system for reproducing a time-varying signal waveform having a bandwidth-time duration product of greater than one-half, comprising:

electrolyte means;

means for varying with time, in relationship to said time-varying signal, forces in said electrolyte means;

means for forming a space-varying solid body in relationship to said forces wherein said body is characterized by successive superimposed layers of material with different layers having differing elemental internal composition;

means for progressively dissolving successive layers of said body to cause the varying of forces within said electrolyte; and means for recovering said time-varying signal waveform by the dissolution of said body.

27. A system including an electrolyte and an electroconducting solid body for reproducing time-varying signal waveforms having bandwidth-time duration products of greater than one-half, comprising:

first means including a substantially steady electric current source for producing forces in said electrolyte, said forces being controlled by both said time-varying signal waveforms and by said steady electric current source;

said first means interconnected with said electrolyte and in contact with said electroconducting solid body to cause deposition from said electrolyte onto said solid body of successive layers having differing elemental compositions representative of the time variations of said signal waveforms; and second means for producing forces in said electrolyte for removing said successive layers from said elecconducting solid body and for converting time-variations of forces in said electrolyte into time-varying signal waveforms, said second means interconnected with said electroconducting solid body and with said electrolyte to remove by electrolytic dissolution said successive layers while converting said time-varying forces in said electrolyte into time-varying signal waveforms representative of original time-varying signal waveforms received by said system.

28. A method for reproducing time-varying signal waveforms having bandwidth-time duration products greater than one-half, comprising the steps of:

producing forces in an electrolyte, said forces being controlled by both said time-varying signal waveforms and by a substantially steady electric current source;

depositing from said electrolyte onto a solid body successive layers having differing elemental compositions representative of the time variations of said signal waveforms;

producing forces in said electrolyte for removing said successive layers from said electroconducting solid body and for converting time-variations of forces in said electrolyte into time-varying signal waveforms; and converting said time-varying forces in said electrolyte into time-varying signal waveforms representative of original time-varying signal waveforms received and stored.

References Cited

UNITED STATES PATENTS

| | | | |
|---|---|---|---|
| 2,457,234 | 12/1948 | Herbert | 204—195 |
| 2,791,473 | 5/1957 | Mattox | 340—173 X |
| 2,624,702 | 1/1953 | De Merre | 204—112 |
| 3,045,178 | 7/1962 | Corrsin | 324—68 |

TERRELL W. FEARS, Primary Examiner

U.S. Cl. X.R.

204—112; 346—74